US011029587B2

(12) United States Patent
Sugiyama

(10) Patent No.: US 11,029,587 B2
(45) Date of Patent: Jun. 8, 2021

(54) PROJECTOR

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/883,589

(22) Filed: May 26, 2020

(65) Prior Publication Data
US 2020/0379327 A1 Dec. 3, 2020

(30) Foreign Application Priority Data

May 27, 2019 (JP) .............................. JP2019-098342

(51) Int. Cl.
G03B 21/16 (2006.01)
G03B 33/12 (2006.01)

(52) U.S. Cl.
CPC .............. G03B 21/16 (2013.01); G03B 33/12 (2013.01)

(58) Field of Classification Search
None
See application file for complete search history.

(56) References Cited

U.S. PATENT DOCUMENTS

| 6,467,295 | B2 | 10/2002 | Oh et al. |
| 8,517,540 | B2 | 8/2013 | Terao |
| 9,488,358 | B2 | 11/2016 | Hirose |
| 2002/0066283 | A1 | 6/2002 | Oh et al. |
| 2002/0191159 | A1 | 12/2002 | Nagao et al. |
| 2005/0122482 | A1* | 6/2005 | Ellis ........................ G03B 21/16 353/61 |
| 2009/0086169 | A1 | 4/2009 | Nakamura |
| 2011/0037954 | A1* | 2/2011 | Tsuchiya ................ G03B 21/16 353/54 |
| 2011/0242499 | A1 | 10/2011 | Terao |
| 2015/0226417 | A1 | 8/2015 | Hirose |
| 2019/0196311 | A1* | 6/2019 | Sugiyama ........... F28D 21/0015 |

FOREIGN PATENT DOCUMENTS

| JP | S64-22322 A | 1/1989 |
| JP | 2002-107698 A | 4/2002 |
| JP | 2002-198478 A | 7/2002 |

(Continued)

Primary Examiner — Michelle M Iacoletti
Assistant Examiner — Danell L Owens
(74) Attorney, Agent, or Firm — Oliff PLC

(57) ABSTRACT

A projector includes a cooler configured to cool a cooling target based on transformation of a refrigerant into gas. A refrigerant generator includes a rotating moisture absorbing and releasing member, a first blower configured to send air to a portion of the member located in a first region, a heat exchanger, a heater configured to heat a portion of the member located in a second region, and a second blower configured to send, to the heat exchanger, air around the heated portion in the member. The heat exchanger includes a housing including an internal space into which the air sent by the second blower flows and a plurality of channels disposed in the internal space. Insides of the channels are separated from the internal space. Cooling air for cooling the air in the internal space via the channels flow through the insides of the channels.

10 Claims, 8 Drawing Sheets

(56) References Cited

FOREIGN PATENT DOCUMENTS

| | | | |
|---|---|---|---|
| JP | 2002-372748 | A | 12/2002 |
| JP | 2007-294655 | A | 11/2007 |
| JP | 2009-075304 | A | 4/2009 |
| JP | 2010-107751 | A | 5/2010 |
| JP | 2011-215457 | A | 10/2011 |
| JP | 2015-148729 | A | 8/2015 |
| JP | 2019-117332 | A | 7/2019 |

* cited by examiner

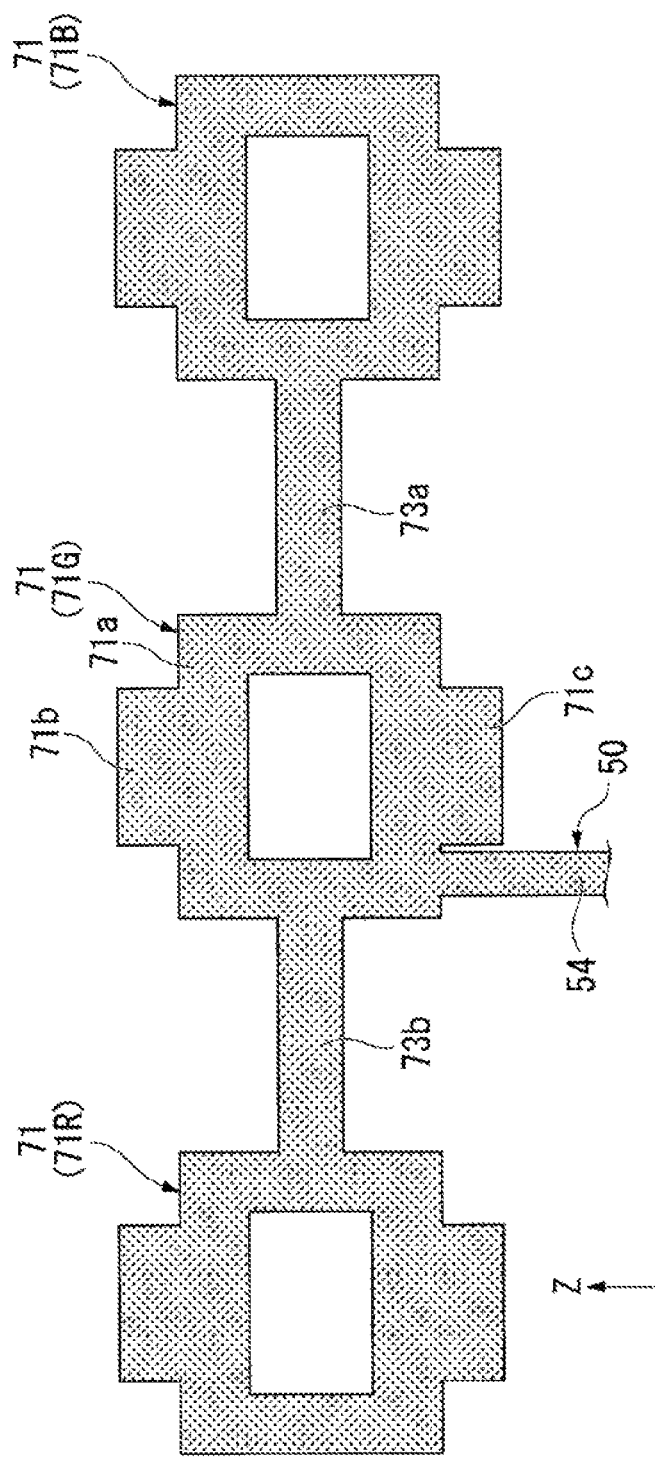

PROJECTOR

The present application is based on, and claims priority from JP Application Serial Number 2019-098342, filed May 27, 2019, the disclosure of which is hereby incorporated by reference herein in its entirety.

BACKGROUND

1. Technical Field

The present disclosure relates to a projector.

2. Related Art

As means for cooling a projector, there have been proposed, for example, cooling means by air cooling for cooling a projector using a blower as disclosed in JP A-2002-107698 (Patent Literature 1) and cooling means by liquid cooling for cooling a projector using a pump that feeds cooling liquid and a pipe for allowing the cooling liquid to pass as disclosed in JP A-2007-294655 (Patent Literature 2).

In recent years, heat quantity of a cooling target cooled by cooling means has been increasing according to, for example, an increase in luminance of a projector. Improvement of cooling performance by the cooling means has been requested. However, when the cooling performance is improved in the cooing means by the air cooling and the liquid cooling described above, the cooling means increases in size and the projector increases in size. In the case of the air cooling, noise by the blower also increases.

SUMMARY

An aspect of the present disclosure is directed to a projector including a cooling target, and the projector includes: a light source device configured to emit light; a light modulator configured to modulate, according to an image signal, the light emitted from the light source device; a projection optical device configured to project the light modulated by the light modulator; and a cooler configured to cool the cooling target based on transformation of a refrigerant into gas. The cooler includes: a refrigerant generator configured to generate the refrigerant; and a refrigerant sender configured to transfer the generated refrigerant toward the cooling target. The refrigerant generator includes: a rotating moisture absorbing and releasing member; a first blower configured to send air to a portion of the moisture absorbing and releasing member located in a first region; a heat exchanger connected to the refrigerant sender; a heater configured to heat a portion of the moisture absorbing and releasing member located in a second region different from the first region; and a second blower configured to send, to the heat exchanger, air around the portion heated by the heater in the moisture absorbing and releasing member. The heat exchanger includes: a housing including an internal space into which the air sent by the second blower flows; and a plurality of channels disposed in the internal space. Insides of the plurality of channels are separated from the internal space. Cooling air for cooling the air in the internal space via the plurality of channels flow through the insides of the plurality of channels.

The refrigerant generator may include a third blower configured to send the cooling air to the insides of the plurality of channels.

The refrigerant generator may include an inflow duct coupled to the housing, inflow ports of the plurality of channels may be opened on an inside of the inflow duct, and the third blower may send the air to the insides of the plurality of channels from the inflow ports via the inflow duct.

The refrigerant sender may include a coupling part made of a porous member configured to couple the housing and the cooling target, and an end portion coupled to the housing in the coupling part may be exposed to the internal space.

The refrigerant generator may include a circulation path in which the air emitted from the second blower circulates, and the circulation path may pass the moisture absorbing and releasing member and the internal space.

The plurality of channels may extend in a direction crossing a direction in which the air flows in the internal space.

The plurality of channels may be linearly extending conduits.

The plurality of channels may extend in directions parallel to one another.

The refrigerant generator may include an external blower configured to send the air to the housing from an outside of the housing.

The cooling target may be the light modulator.

BRIEF DESCRIPTION OF THE DRAWINGS

FIG. 9 is a diagram showing a refrigerant holder in the embodiment.

DESCRIPTION OF EXEMPLARY EMBODIMENTS

Figure 1:
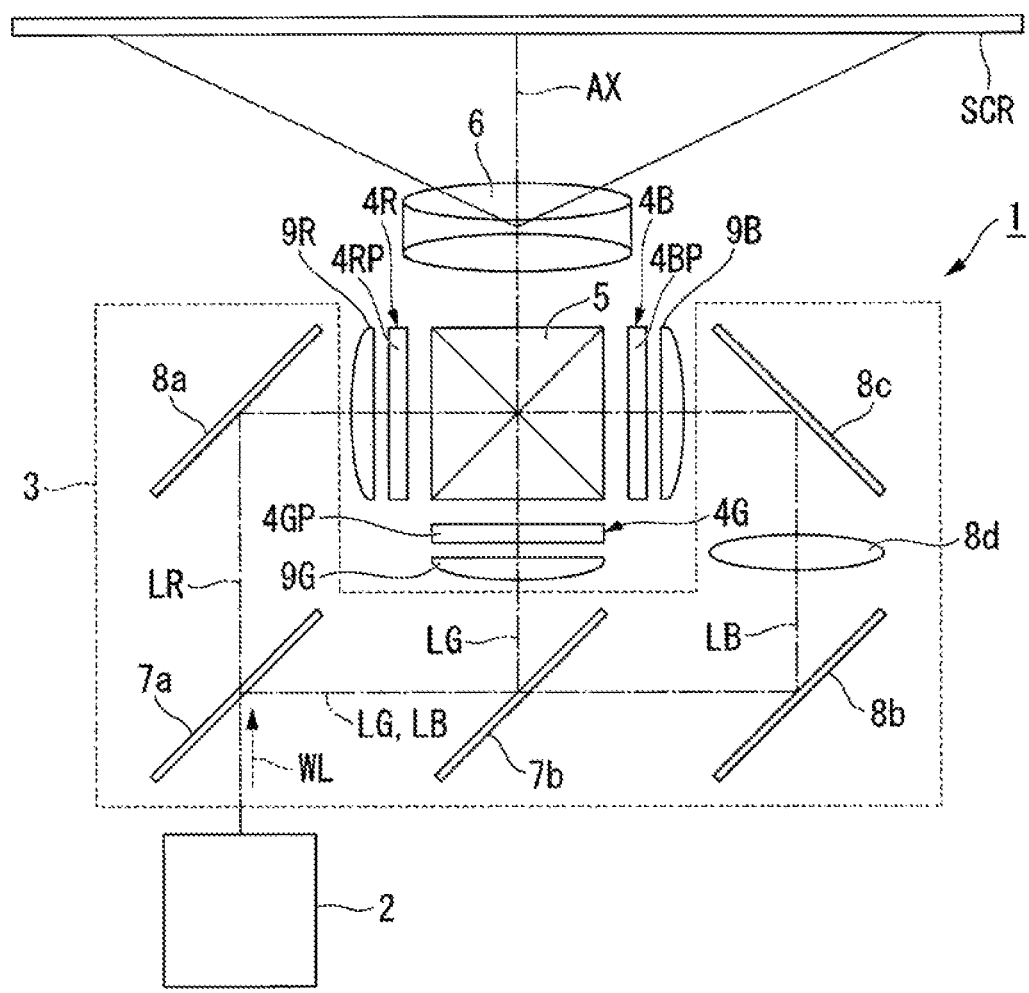
FIG. 1 is a schematic configuration diagram showing a projector in an embodiment.

A projector according to an embodiment of the present disclosure is explained below with reference to the drawings. The scope of the present disclosure is not limited to the embodiment explained below and can be optionally changed within the scope of the technical idea of the present disclosure. In the drawings referred to below, to clearly show components, scales, numbers, and the like in structures are sometimes differentiated from scales, numbers, and the like in actual structures.

Figure 2:
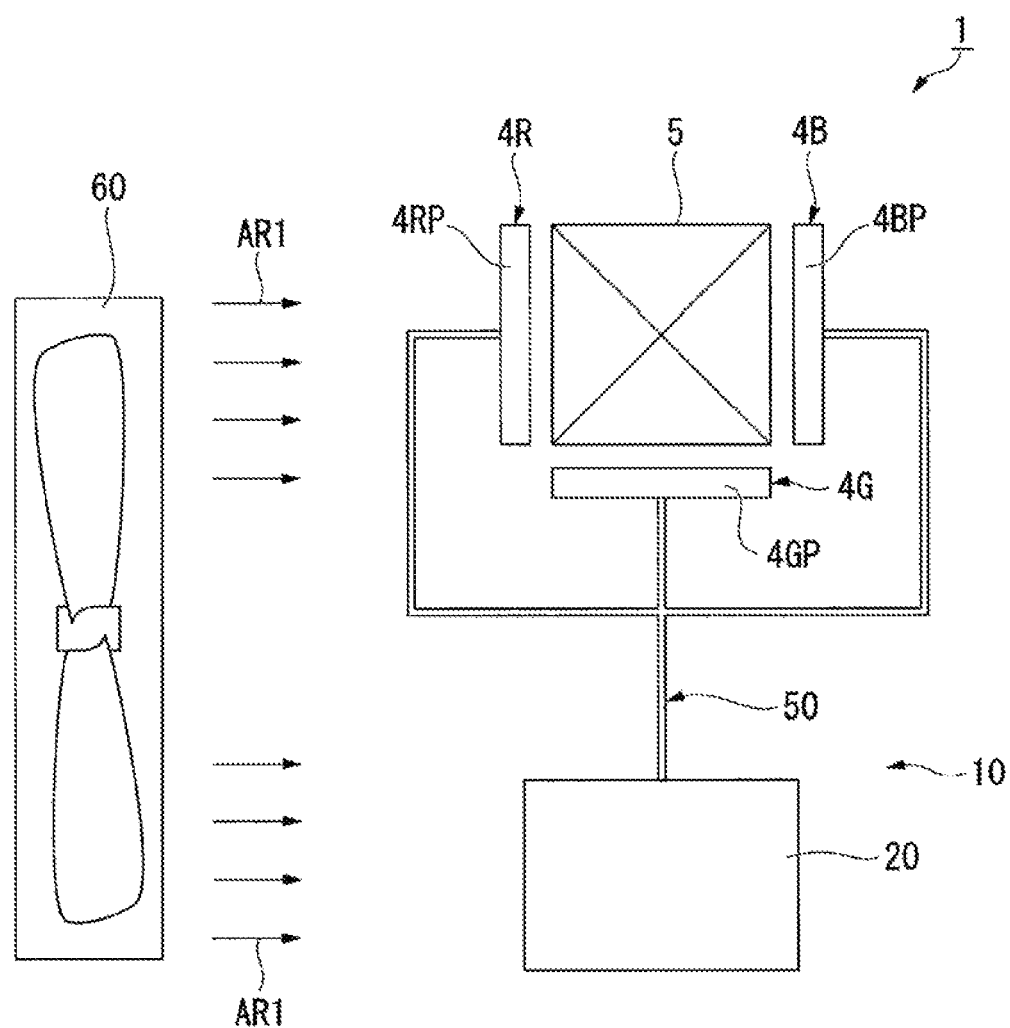
FIG. 2 is a schematic diagram showing a part of the projector in the embodiment.

FIG. 1 is a schematic configuration diagram showing a projector 1 in this embodiment. FIG. 2 is a schematic diagram showing a part of the projector 1 in this embodiment. As shown in FIG. 1, the projector 1 includes a light source device 2, a color separation optical system 3, a light modulation unit 4R, a light modulation unit 4G, a light modulation unit 4B, a light combination optical system 5, and a projection optical device 6. The light modulation unit 4R includes a light modulator 4RP. The light modulation unit 4G includes a light modulator 4GP. The light modulation unit 4B includes a light modulator 4BP.

The light source device 2 emits illumination light WL, which is adjusted to have a substantially uniform illuminance distribution, toward the color separation optical system 3. The light source device 2 includes, for example, a semiconductor laser as a light source. The color separation optical system 3 separates the illumination light WL emitted from the light source device 2 into red light LR, green light LG, and blue light LB. The color separation optical system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL emitted from the light source device 2 into the red light LR and mixed light of the green light LG and the blue light LB. The first dichroic mirror 7a has a characteristic of transmitting the red light LR and reflecting the green light LG and the blue light LB. The second dichroic mirror 7b separates the mixed light of the green light LG and the blue light LB into the green light LG and the blue light LB. The second dichroic mirror 7b has a characteristic of reflecting the green light LG and transmitting the blue light LB.

The first reflection mirror 8a is disposed in an optical path of the red light LR and reflects the red light LR transmitted through the first dichroic mirror 7a toward the light modulator 4RP. The second reflection mirror 8b and the third reflection mirror 8c are disposed in an optical path of the blue light LB and guide the blue light LB transmitted through the second dichroic mirror 7b to the light modulator 4BP.

Each of the light modulator 4RP, the light modulator 4GP, and the light modulator 4BP is configured from a liquid crystal panel. The light modulator 4RP modulates, according to an image signal, the red light LR in the light emitted from the light source device 2. The light modulator 4GP modulates, according to an image signal, the green light LG in the light emitted from the light source device 2. The light modulator 4BP modulates, according to an image signal, the blue light LB in the light emitted from the light source device 2. Consequently, the light modulators 4RP, 4GP, and 4BP form image lights corresponding to the color lights. Although not shown in FIG. 1, polarizing plates are disposed on a light incident side and a light emission side of each of the light modulators 4RP, 4GP, and 4BP.

A field lens 9R that collimates the red light LR made incident on the light modulator 4RP is disposed on the light incident side of the light modulator 4RP. A field lens 9G that collimates the green light LG made incident on the light modulator 4GP is disposed on the light incident side of the light modulator 4GP. A field lens 9B that collimates the blue light LB made incident on the light modulator 4BP is disposed on the light incident side of the light modulator 4BP.

The light combination optical system 5 is configured from a substantially cubic cross dichroic prism. The light combination optical system 5 combines image lights of the colors emitted from the light modulators 4RP, 4GP, and 4BP. The light combination optical system 5 emits combined image light toward the projection optical device 6. The projection optical device 6 is configured from a projection lens group. The projection optical device 6 enlarges the image light combined by the light combination optical system 5, that is, light modulated by the light modulators 4RP, 4GP, and 4BP and projects the image toward a screen SCR. Consequently, an enlarged color image (video) is displayed on the screen SCR.

The projector 1 further includes a cooler 10 as shown in FIG. 2. The cooler 10 cools cooling targets included in the projector 1 when a refrigerant W changes to gas. In this embodiment, the refrigerant W is, for example, liquid water. Accordingly, in the following explanation, the change of the refrigerant W to gas is sometimes simply referred to as vaporization. In this embodiment, the cooling targets include the light modulation units 4R, 4G, and 4B. In other words, in this embodiment, the cooling targets include the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that transfers the generated refrigerant W toward the cooling targets. The refrigerant W sent to the cooling targets, that is, in this embodiment, the light modulation units 4R, 4G, and 4B by the refrigerant sender 50 can take heat from the cooling targets by vaporizing. The cooler 10 can cool the cooling targets. The sections are explained in detail below.

Figure 3:
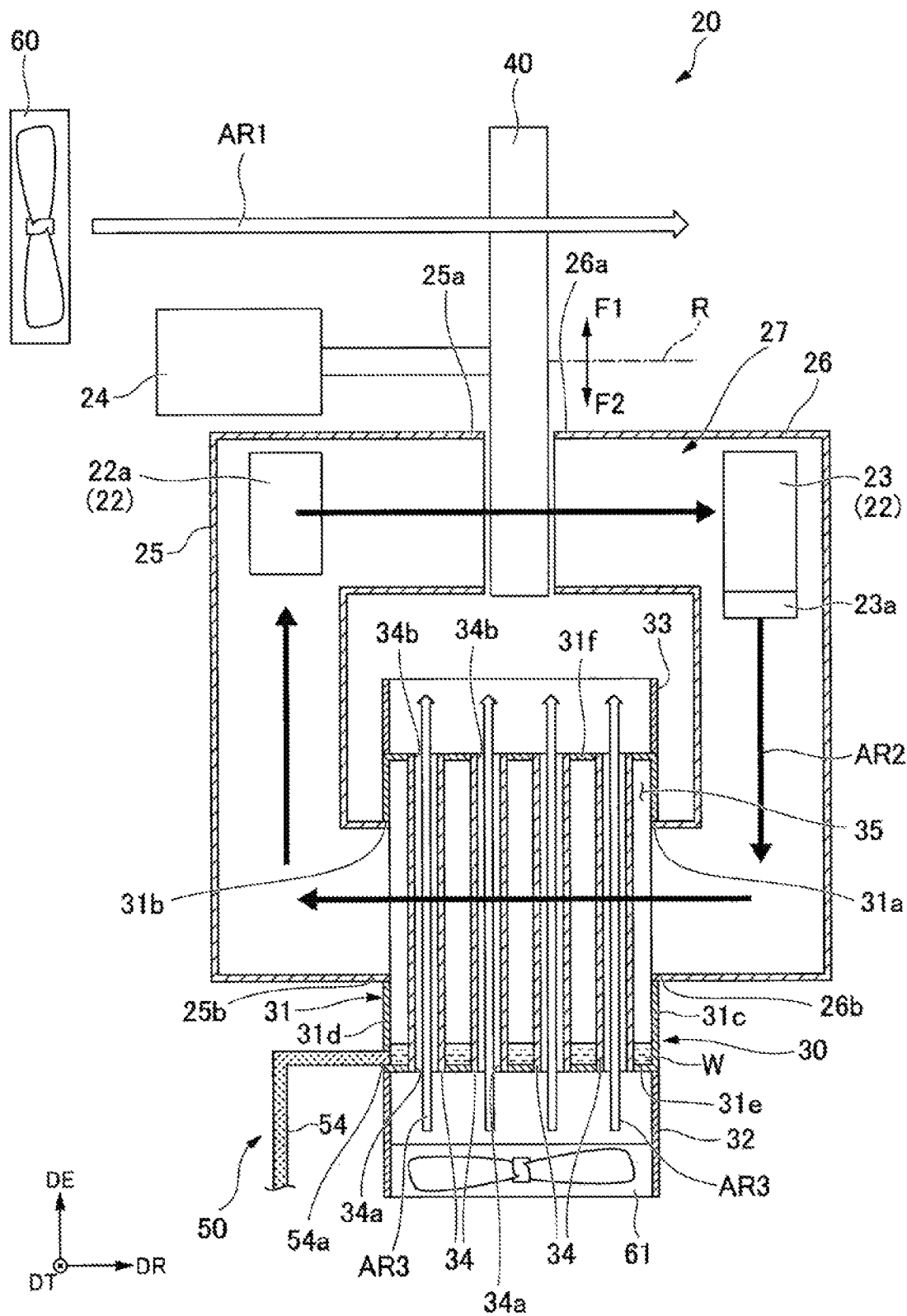
FIG. 3 is a schematic configuration diagram schematically showing a refrigerant generator in the embodiment.

FIG. 3 is a schematic configuration diagram schematically showing the refrigerant generator 20 in this embodiment. The refrigerant generator 20 includes, as shown in FIG. 3, a moisture absorbing and releasing member 40, a motor (a driver) 24, a first blower (a cooling air blower) 60, a heat exchanger 30, a circulation duct 25, a circulation duct 26, a heater 22, a second blower 23, and a third blower 61.

Figure 4:
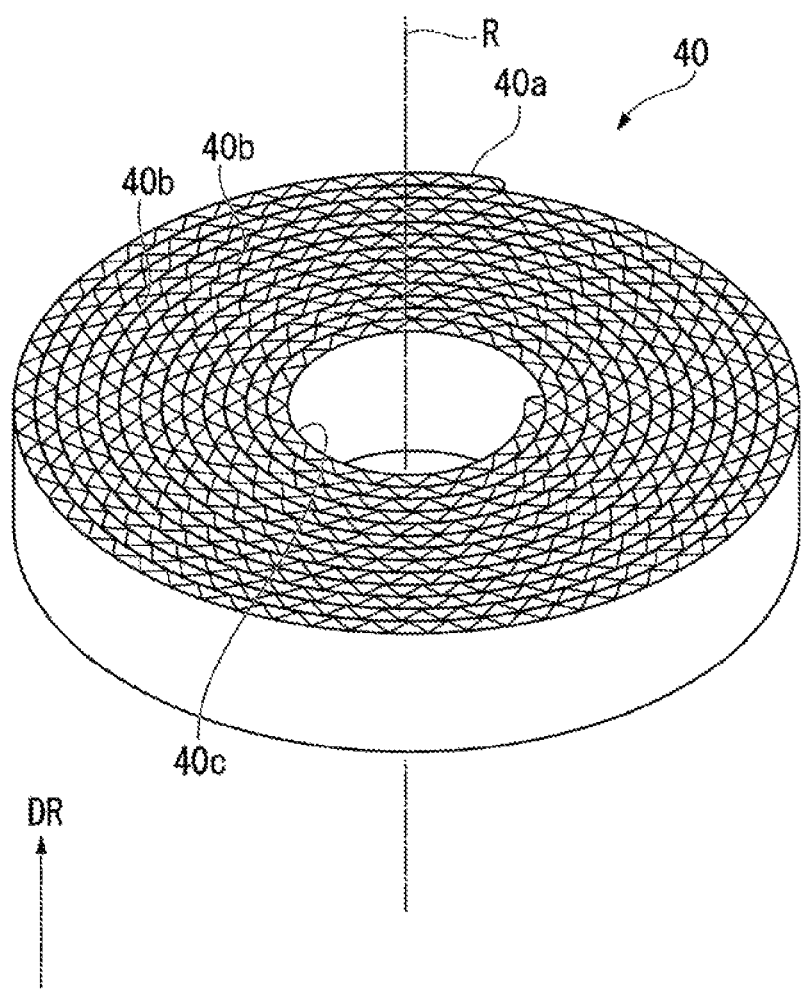
FIG. 4 is a perspective view showing a moisture absorbing and releasing member in the embodiment.

FIG. 4 is a perspective view showing the moisture absorbing and releasing member 40. The moisture absorbing and releasing member 40 has a flat columnar shape centering on a rotation axis R as shown in FIG. 4. A center hole 40c centering on the rotation axis R is formed in the center of the moisture absorbing and releasing member 40. The center hole 40c pierces through the moisture absorbing and releasing member 40 in the axial direction of the rotation axis R. The moisture absorbing and releasing member 40 rotates around the rotation axis R. In the following explanation, the axial direction of the rotation axis R is referred to as "rotation axis direction DR" and indicated by a DR axis in the figures as appropriate.

The moisture absorbing and releasing member 40 includes a countless through-holes 40b piercing through the moisture absorbing and releasing member 40 in the rotation axis direction DR. The moisture absorbing and releasing member 40 is a porous member. The moisture absorbing and releasing member 40 has moisture absorbing and releasing properties. In this embodiment, the moisture absorbing and releasing member 40 is formed by, for example, winding a belt-like member 40a including the through-holes 40b around the rotation axis R and applying a substance having moisture absorbing and releasing properties to surfaces exposed to the outside in the wound belt-like member 40a. The surfaces exposed to the outside in the wound belt-like member 40a include the outer surface of the moisture absorbing and releasing member 40, the inner circumferential surface of the center hole 40c, and the inner side surfaces of the through-holes 40b. The entire moisture absorbing and releasing member 40 may be formed of the substance having the moisture absorbing and releasing properties. Examples of the substance having the moisture absorbing and releasing properties include zeolite and silica gel.

An output shaft of the motor 24 shown in FIG. 3 is inserted into the center hole 40c of the moisture absorbing and releasing member 40 and fixed. The motor 24 rotates the moisture absorbing and releasing member 40 around the rotation axis R. Rotation speed of the moisture absorbing and releasing member 40 rotated by the motor 24 is, for example, approximately 0.2 rpm or more and 5 rpm or less.

The first blower 60 is, for example, an air intake fan that takes outside air into the projector 1. The first blower 60 sends air AR1 to a portion of the moisture absorbing and releasing member 40 located in a first region F1. The first region F1 is a region further on one side than the rotation axis R in a direction orthogonal to the rotation axis R. On the other hand, in the direction orthogonal to the rotation axis R, a region further on the other side than the rotation axis R, that is, a region on the opposite side of the first region F1 with respect to the rotation axis R is a second region F2. The first region F1 is a region further on the upper side than the rotation axis R in FIG. 3. The second region F2 is a region further on the lower side than the rotation axis R in FIG. 3.

As shown in FIG. 2, the first blower 60 sends the air AR1 to the light modulation units 4R, 4G, and 4B, which are the cooling targets, as well. In other words, in this embodiment, the first blower 60 is a cooling air blower that sends the air AR1 to the cooling targets. The first blower 60 is not particularly limited if the first blower 60 can send the air AR1. The first blower 60 may be either an axial fan or may be a centrifugal fan.

Figure 5:
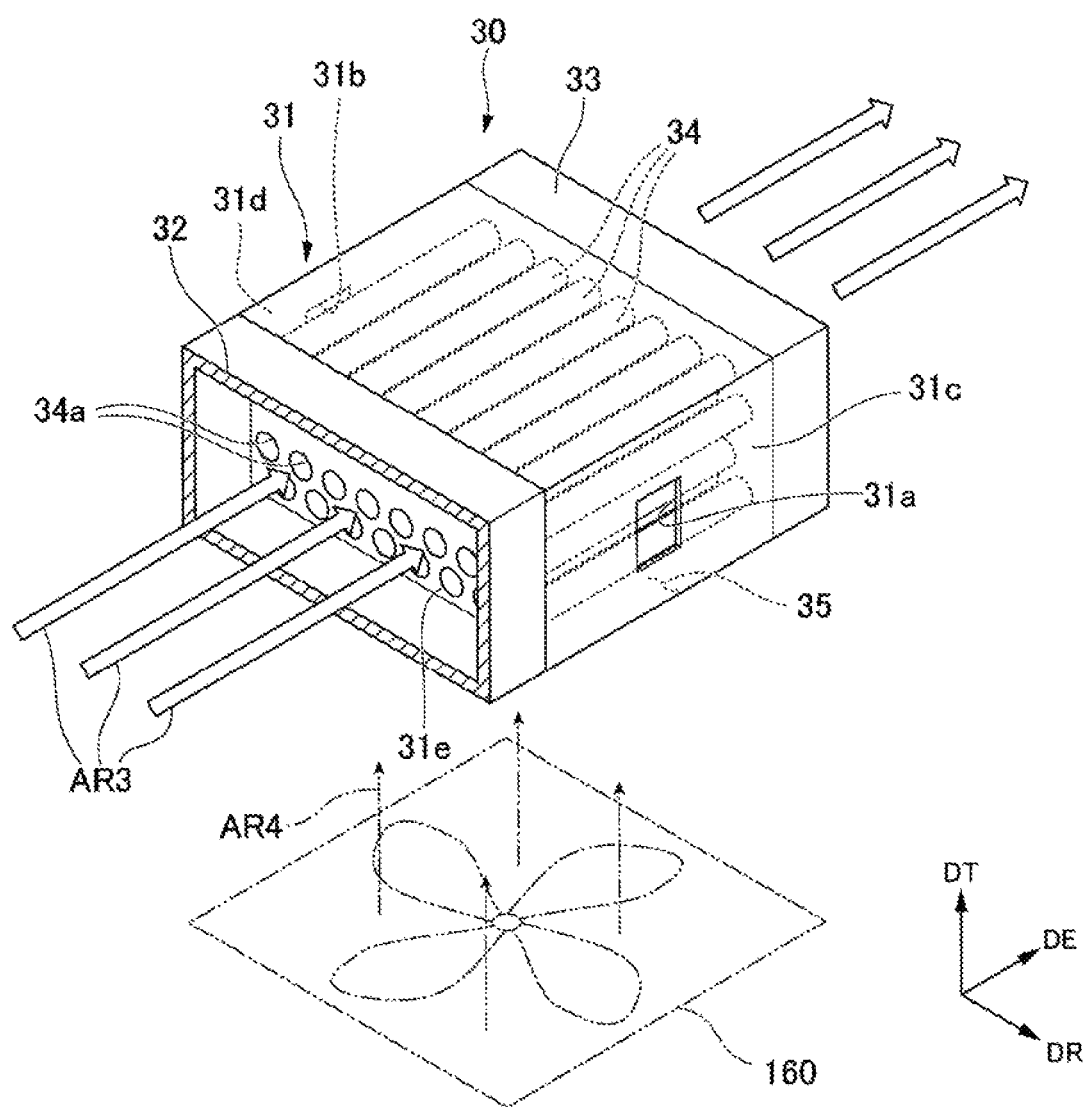
FIG. 5 is a partial sectional perspective view showing a heat exchanger in the embodiment.

The heat exchanger 30 is a portion where the refrigerant W is generated. FIG. 5 is a partial sectional perspective view showing the heat exchanger 30. As shown in FIG. 5, the heat exchanger 30 includes a housing 31, a plurality of channels 34, an inflow duct 32, and an outflow duct 33.

In this embodiment, the housing 31 has a rectangular parallelepiped box shape. The housing 31 includes an internal space 35, an inflow hole 31a, and an outflow hole 31b. Air sent by the second blower 23 flows into the internal space 35. The inflow hole 31a is provided in a sidewall 31c on one side (a +DR side) in the rotation axis direction DR in the housing 31. The outflow hole 31b is provided in a sidewall 31d on the other side (a −DR side) in the rotation axis direction DR in the housing 31. The inflow hole 31a and the outflow hole 31b are connected to the internal space 35. The inflow hole 31a and the outflow hole 31b have, for example, a rectangular shape. In this embodiment, the inflow hole 31a and the outflow hole 31b overlap each other when viewed along the rotation axis direction DR.

The plurality of channels 34 are disposed in the internal space 35. Air sent by the third blower 61 explained below circulates on the insides of the plurality of channels 34. In this embodiment, the plurality of channels 34 are linearly extending conduits. The channels 34 have, for example, a cylindrical shape. The channels 34 are opened on both sides in extending directions of the channels 34. The plurality of channels 34 extend, for example, in directions parallel to one another. The directions in which the channels 34 extend are, for example, orthogonal to the rotation axis direction DR. In the following explanation, the directions in which the channels 34 extend are referred to as "extending direction DE" and indicated by a DE axis in the figures as appropriate. The first region F1 and the second region F2 are divided across the rotation axis R in the extending direction DE orthogonal to the rotation axis direction DR.

In this specification, "the plurality of channels extend in directions parallel to one another" includes "the plurality of channels extend in directions substantially parallel to one another" in addition to "the plurality of channels extend strictly in parallel to one another". "The plurality of channels extend in directions substantially parallel to one another" includes, for example, "an angle formed by the channels is approximately 10° or less".

In this embodiment, a plurality of rows of the channels 34 arranged along the rotation axis direction DR are provided in a plurality of rows along a direction orthogonal to both of the rotation axis direction DR and the extending direction DE. In the following explanation, the direction orthogonal to both of the rotation axis direction DR and the extending direction DE is referred to as "thickness direction DT" and indicated by a DT axis in the figures as appropriate. The plurality of channels 34 form, for example, four rows arranged in the thickness direction DT. The channels 34 included in one row of rows adjacent to each other in the thickness direction DT are located among the channels 34 included in the other row in the rotation axis direction DR. In other words, the plurality of channels 34 are arranged in zigzag when viewed along the extending direction DE.

As shown in FIG. 3, the channels 34 extend from a sidewall 31e on the other side (a −DE side) in the extending direction DE in the housing 31 to a sidewall 31f on one side (a +DE side) in the extending direction DE in the housing 31. End portions on the other side (the −DE side) in the extending direction DE in the channels 34 are inflow ports 34a opened on a surface on the other side in the extending direction DE in the sidewall 31e and opened to the outside of the housing 31. End portions on one side (the +DE side) in the extending direction DE in the channels 34 are outflow ports 34b opened on a surface on one side in the extending direction DE in the sidewall 31f and opened to the outside of the housing 31. Consequently, the channels 34 connect spaces located on both sides in the extending direction DE of the housing 31. On the other hand, the insides of the plurality of channels 34 are not connected to the internal space 35. Consequently, air circulating on the insides of the plurality of channels 34 and air flowing into the internal space 35 are not mixed. In other words, the insides of the plurality of channels 34 are separated from the internal space 35.

The inflow duct 32 and the outflow duct 33 are ducts extending in the extending direction DE. In this embodiment, the inflow duct 32 and the outflow duct 33 have a rectangular tubular shape. The inflow duct 32 and the outflow duct 33 are disposed across the housing 31 in the extending direction DE and respectively coupled to the housing 31. The inflow duct 32 is located on the other side (the −DE side) in the extending direction DE of the housing 31. The outflow duct 33 is located on one side (the +DE side) in the extending direction DE of the housing 31.

An end portion on one side (the +DE side) in the extending direction DE in the inflow duct 32 is fixed to the outer peripheral edge portion of the sidewall 31e and closed by the sidewall 31e. The inflow ports 34a of the plurality of channels 34 are opened on the inside of the inflow duct 32. Consequently, the inside of the inflow duct 32 is connected to the insides of the plurality of channels 34 via the inflow ports 34a.

An end portion on the other side (the −DE side) in the extending direction DE in the outflow duct 33 is fixed to the outer peripheral edge portion of the sidewall 31f and closed by the sidewall 31f. The outflow ports 34b of the plurality of channels 34 are opened on the inside of the outflow duct 33. Consequently, the inside of the outflow duct 33 is connected to the insides of the plurality of channels 34 via the outflow ports 34b.

The circulation duct 26 is a duct disposed on one side (the +DR side) of the moisture absorbing and releasing member 40 in the rotation axis direction DR. The circulation duct 26 extends from one side in the rotation axis direction DR of the moisture absorbing and releasing member 40 to one side in the rotation axis direction DR of the housing 31. One end portion 26a of the circulation duct 26 is opened on the other side (the −DR side) in the rotation axis direction DR toward a portion of the moisture absorbing and releasing member 40 located in the second region F2. The other end portion 26b of the circulation duct 26 is coupled to the inflow hole 31a of the housing 31 and opened to the internal space 35. Consequently, the inside of the circulation duct 26 is connected to the internal space 35.

The circulation duct 25 is a duct disposed on the other side (the −DR side) of the moisture absorbing and releasing member 40 in the rotation axis direction DR. The circulation duct 25 extends from the other side in the rotation axis direction DR of the moisture absorbing and releasing member 40 to the other side in the rotation axis direction DR of the housing 31. One end portion 25a of the circulation duct 25 is opened on one side (the +DR side) in the rotation axis direction DR toward the portion of the moisture absorbing and releasing member 40 located in the second region F2. The other end portion 25b of the circulation duct 25 is coupled to the outflow hole 31b of the housing 31 and opened to the internal space 35. Consequently, the inside of the circulation duct 25 is connected to the internal space 35.

The heater 22 includes a heating main body 22a. The heating main body 22a is disposed on the inside of the circulation duct 25. The heating main body 22a is disposed on the other side (the −DR side) of the portion of the moisture absorbing and releasing member 40 located in the second region F2 in the rotation axis direction DR. The heating main body 22a is, for example, an electric heater. The heating main body 22a heats atmosphere (air) on the inside of the circulation duct 25. In this embodiment, the heater 22 includes the second blower 23.

The second blower 23 is disposed on the inside of the circulation duct 26. The second blower 23 is disposed on one side (the +DR side) in the portion of the moisture absorbing and releasing member 40 located in the second region F2 in the rotation axis direction DR. The second blower 23 is, for example, a centrifugal fan. The second blower 23 emits air sucked from the other side (the −DR side) in the rotation axis direction DR to the other side (the −DE side) in the extending direction DE from an exhaust port 23a. The air emitted from the exhaust port 23a flows into the internal space 35 of the housing 31 via the inflow hole 31a. In other words, the second blower 23 sends the air to the internal space 35 via the inflow hole 31a. The second blower 23 may be, for example, an axial fan.

The air emitted from the second blower 23 to the internal space 35 is air sucked from the other side (the −DR side) in the rotation axis direction DR of the second blower 23 via one end portion 26a of the circulation duct 26 and is air that has passed the portion of the moisture absorbing and releasing member 40 located in the second region F2. In other words, the second blower 23 causes the air to pass the portion of the moisture absorbing and releasing member 40 located in the second region F2 different from the first region F1 and sends the air to the heat exchanger 30. In this embodiment, the air before passing the portion of the moisture absorbing and releasing member 40 located in the second region F2 flows on the inside of the circulation duct 25. Therefore, the heating main body 22a heats the air before passing the portion of the moisture absorbing and releasing member 40 located in the second region F2.

In this way, in this embodiment, the heater 22 sends, with the second blower 23, the air heated by the heating main body 22a to the portion of the portion of the moisture absorbing and releasing member 40 located in the second region F2 to heat the portion of the moisture absorbing and releasing member 40 located in the second region F2. Consequently, the second blower 23 sends the air around the portion heated by the heater 22 in the moisture absorbing and releasing member 40 to the heat exchanger 30.

The air flowing into to internal space 35 of the heat exchanger 30 from the second blower 23 passes the internal space 35 in the rotation axis direction DR and flows into the inside of the circulation duct 25 via the outflow hole 31b. The air flowing into the inside of the circulation duct 25 is heated by the heating main body 22a, passes the portion of the moisture absorbing and releasing member 40 located in the second region F2 again, flows into the inside of the circulation duct 26, and is sucked by the second blower 23.

As explained above, in this embodiment, the refrigerant generator 20 includes a circulation path 27 in which the air emitted from the second blower 23 circulates. The circulation path 27 is configured by at least the circulation ducts 25 and 26 and the heat exchanger 30. The circulation path 27 passes the heating main body 22a, the moisture absorbing and releasing member 40, and the internal space 35. Small gaps are provided between the moisture absorbing and releasing member 40 and the circulation ducts 25 and 26 but the circulation path 27 is substantially closed. Air is suppressed from flowing into the inside of the circulation path 27 from the outside. In the following explanation, air emitted from the second blower 23 and circulating in the circulation path 27 is referred to as air AR2.

In this embodiment, the third blower 61 is disposed on the inside of the inflow duct 32. The third blower 61 may be either an axial fan or a centrifugal fan. The third blower 61 emits cooling air AR3 to one side (the +DE side) in the extending direction DE in the inflow duct 32. The emitted cooling air AR3 flows into the insides of the channels 34 via the inflow ports 34a. In other words, in this embodiment, the third blower 61 sends the cooling air AR3 to the insides of a plurality of channels 34 from the inflow ports 34a via the inflow duct 32. Consequently, the cooling air AR3 circulates on the insides of the plurality of channels 34. The cooling air AR3 passing the insides of the channels 34 cools the air AR2 in the internal space 35 via the channels 34. In this way, the third blower 61 can cool the air AR2 flowing in the internal space 35 via the channels 34 by sending the cooling air AR3 to the insides of the channels 34. The cooling air AR3 sent to the insides of the channels 34 flows out to the inside of the outflow duct 33 from the outflow port 34b.

When the air AR1 is sent to the portion of the moisture absorbing and releasing member 40 located in the first region F1 from the first blower 60, vapor contained in the air AR1 is absorbed by the portion of the moisture absorbing and releasing member 40 located in the first region F1. The portion of the moisture absorbing and releasing member 40, which has absorbed the vapor, moves from the first region F1 to the second region F2 when the moisture absorbing and releasing member 40 is rotated by the motor 24. The air AR2 having relatively high temperature heated by the heating main body 22a passes the portion of the moisture absorbing and releasing member 40 located in the second region F2. Consequently, moisture absorbed by the moisture absorbing and releasing member 40 is vaporized and released to the air AR2.

The air AR2, which has passed the moisture absorbing and releasing member 40 to contain the vapor absorbed from the air AR1, is sent to the internal space 35 of the heat exchanger 30 by the second blower 23. The air AR2 having the relatively high temperature sent to the internal space 35 circulates in a direction crossing the extending direction DE of the plurality of channels 34 in the internal space 35 and is cooled by the cooling air AR3 passing the insides of the plurality of channels 34. Consequently, the vapor contained in the air AR2 condenses to be liquid water, that is, the refrigerant W. In this way, in the housing 31 of the heat exchanger 30, that is, in the internal space 35, the air AR2 flowing into the internal space 35 is cooled by the cooling air AR3 sent to the insides of the plurality of channels 34. Consequently, the refrigerant W is generated from the air AR2 flowing into the internal space 35.

In this embodiment, the refrigerant sender 50 is made of the porous member and transfers the refrigerant W with the capillarity. Examples of the material of the refrigerant sender 50 include polypropylene, cotton, and porous metal. The material of the refrigerant sender 50 is desirably a material that can make the surface tension of the refrigerant sender 50 relatively large.

Figure 6:
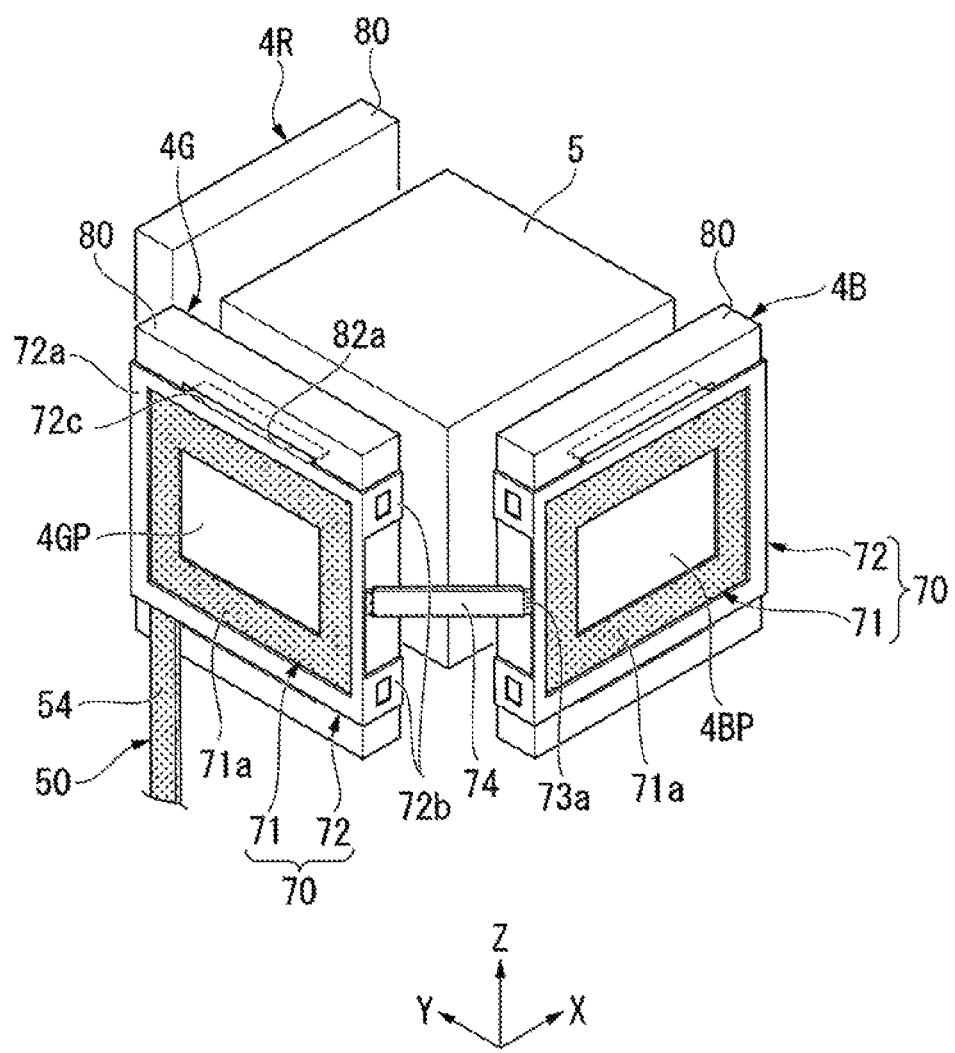
FIG. 6 is a perspective view showing a light modulation unit and a light combination optical system in the embodiment.

The refrigerant sender 50 includes a coupling part 54 coupled to the housing 31. The coupling part 54 is a portion that couples the housing 31 and a cooling target. Since the refrigerant sender 50 is made of the porous member in this embodiment, the coupling part 54 is made of a porous member. An end portion 54a coupled to the housing 31 in the coupling part 54 is exposed to the internal space 35. The coupling part 54 pierces through the sidewall 31d of the housing 31 and projects to the outside of the housing 31 from the internal space 35 of the housing 31. The coupling part 54 has a thin belt shape. As shown in FIG. 6, the coupling part 54 projecting to the outside of the housing 31 extends to the light modulation unit 4G, which is the cooling target. FIG. 6 is a perspective view showing the light modulation units 4R, 4G, and 4B and the light combination optical system 5.

The light modulation units 4R, 4G, and 4B, which are the cooling targets in this embodiment, are explained more in detail. In the following explanation, an up-down direction Z, a positive side of which is an upper side and a negative side of which is a lower side, is indicated by a Z axis in the figures as appropriate. A direction parallel to an optical axis AX of a projection lens closest to a light emission side in the projection optical device 6, that is, a direction parallel to a projecting direction of the projection optical device 6 is referred to as "optical axis direction X" and indicated by an X axis in the figures as appropriate. The optical axis direction X is orthogonal to the up-down direction Z. A direction orthogonal to both of the optical axis direction X and the up-down direction Z is referred to as "width direction Y" and indicated by an Y axis in the figures as appropriate.

The up-down direction Z, the upper side, and the lower side are simply names for explaining relative positional relations among the sections. Actual disposition relations and the like may be disposition relations and the like other than disposition relations and the like indicated by these names.

Figure 7:
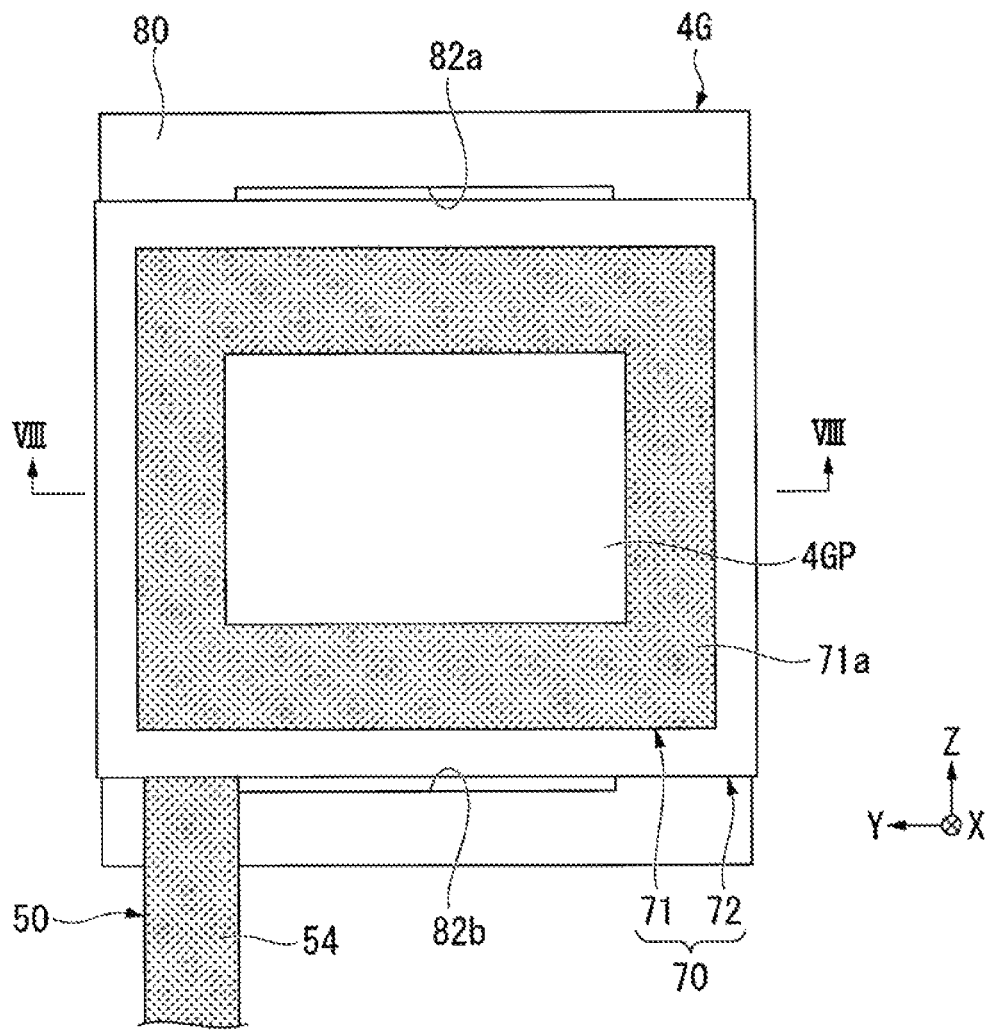
FIG. 7 is a diagram of the light modulation unit in the embodiment viewed from a light incident side.
Figure 8:
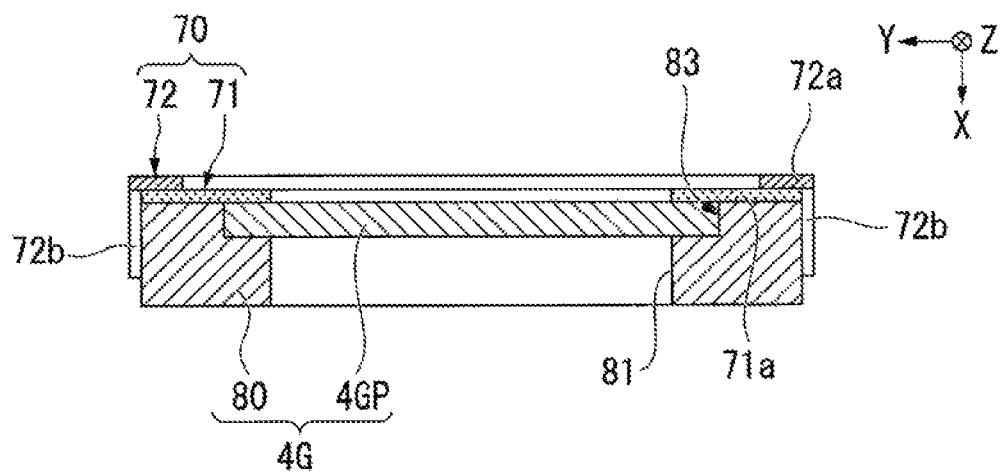
FIG. 8 is a diagram showing the light modulation unit in the embodiment and is a VIII-VIII sectional view in FIG. 7.

FIG. 7 is a diagram of the light modulation unit 4G viewed from the light incident side. FIG. 8 is a diagram showing the light modulation unit 4G and is a VIII-VIII sectional view in FIG. 7.

The light modulation unit 4R, the light modulation unit 4G, and the light modulation unit 4B, which are the cooling targets, are disposed to surround the periphery of the light combination optical system 5. The light modulation unit 4R and the light modulation unit 4B are disposed on opposite sides from each other across the light combination optical system 5 in the width direction Y. The light modulation unit 4G is disposed on the light incident side (a −X side) in the optical axis direction X of the light combination optical system 5. The structure of the light modulation unit 4R, the structure of the light modulation unit 4G, and the structure of the light modulation unit 4B are the same except that positions and postures in which the light modulation unit 4R, the light modulation unit 4G, and the light modulation unit 4B are disposed. Therefore, in the following explanation, only the light modulation unit 4G is sometimes representatively explained.

The light modulation unit 4G includes a holding frame 80 that holds the light modulator 4GP. As shown in FIGS. 6 to 8, the holding frame 80 has a substantially rectangular parallelepiped shape flat in a direction in which light is made incident on the light modulator 4GP and long in the up-down direction Z. The direction in which light is made incident on the light modulator 4GP is, for example, the optical axis direction X.

As shown in FIG. 8, the holding frame 80 includes a through-hole 81 piercing through the holding frame 80 in the direction in which light is made incident. A step part 83, where the width of the through-hole 81 is wider, is provided at the edge on the light incident side (the −X side) of the through-hole 81. The light modulator 4GP is fit in the step part 83 and held by the holding frame 80. As shown in FIG. 7, insertion grooves 82a and 82b are formed in portions on both sides in the up-down direction Z on the surface on the light incident side of the holding frame 80.

As shown in FIGS. 6 to 8, the projector 1 further includes a cooling facilitator 70 provided in the light modulation unit 4G, which is the cooling target. The cooling facilitator 70 includes a refrigerant holder 71 and a fixing member 72. The refrigerant holder 71 is attached to a surface of the holding frame 80 of the light modulation unit 4G, which is the cooling target. In this embodiment, the refrigerant holder 71 is provided on a surface on the light incident side (the −X side) of the light modulator 4GP in the holding frame 80. The refrigerant holder 71 is made of a porous member for holding the refrigerant W. Examples of the material of the refrigerant holder 71 include polypropylene, cotton, and porous metal. The material of the refrigerant holder 71 can be, for example, the same as the material of the refrigerant sender 50. The material of the refrigerant holder 71 is desirably a material that can make the surface tension of the refrigerant holder 71 relatively large.

FIG. 9 is a diagram showing the refrigerant holder 71. The refrigerant holder 71 includes, as shown in FIG. 9, a rectangular frame-like main body 71a and inserted parts 71b and 71c provided at end portions on both side in the up-down direction Z in the main body 71a. As shown in FIG. 8, the main body 71a covers a part of the surface on the light incident side (the −X side) of the light modulator 4GP in the holding frame 80. A portion on the inner edge side in the main body 71a covers an outer edge portion of the light modulator 4GP. The inserted part 71b is bent and inserted into the insertion groove 82a of the holding frame 80. The inserted part 71c is bent and inserted into the insertion groove 82b of the holding frame 80.

The fixing member 72 is a member for fixing the refrigerant holder 71. As shown in FIGS. 6 and 8, the fixing member 72 is a tabular member. The fixing member 72 is, for example, made of metal. The fixing member 72 includes a rectangular frame-like frame 72a, attaching parts 72b, and inserted parts 72c. As shown in FIGS. 7 and 8, the frame 72a covers the outer edge portion of the refrigerant holder 71. The holding frame 80, the refrigerant holder 71, and the frame 72a are stacked in a direction of light passing through the light modulation unit 4G (the optical axis direction X). In the following explanation, a direction in which the holding frame 80, the refrigerant holder 71, and the frame 72a are stacked is simply referred to as "stacking direction". The fixing member 72 holds and fixes, with the frame 72a, the refrigerant holder 71 in the stacking direction (the optical axis direction X) between the fixing member 72 and the holding frame 80.

The inner edge of the frame 72a is provided further on the outer side than the inner edge of the refrigerant holder 71. Accordingly, a part of the refrigerant holder 71, that is, in this embodiment, a portion further on the inner side than the frame 72a is exposed when viewed from the fixing member 72 side in the stacking direction.

As shown in FIGS. 6 and 8, the attaching parts 72b are respectively provided at both end portions in the width direction Y at both end portions in the up-down direction Z of the frame 72a. The attaching parts 72b project to the holding frame 80 side (a +X side) from the frame 72a. The attaching parts 72b are engaged with protrusions provided on side surfaces of the holding frame 80. Consequently, the fixing member 72 is fixed to the holding frame 80.

The inserted parts 72c are provided at both end portions in the up-down direction Z of the frame 72a. The inserted parts 72c project to the holding frame 80 side (the +X side) from the frame 72a. The inserted parts 72c are inserted into the insertion grooves 82a and 82b of the holding frame 80. The inserted parts 72c press the inserted parts 71b and 71c of the refrigerant holder 71 on the insides of the insertion grooves 82a and 82b.

The cooling facilitators 70 are provided in each of the plurality of light modulation units 4R, 4G, and 4B. In other words, the refrigerant holder 71 and the fixing member 72 are provided in each of the plurality of light modulation units 4R, 4G, and 4B. As shown in FIG. 9, a refrigerant holder 71G provided in the light modulation unit 4G among the light modulation units 4R, 4G, and 4B is coupled to the refrigerant sender 50. More specifically, the coupling part 54 of the refrigerant sender 50 is coupled to the lower end portion of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that the coupling part 54 is not connected to the refrigerant holder 71B and the refrigerant holder 71R.

In this embodiment, connecting parts 73a and 73b made of a porous member that connect the refrigerant holders 71 provided in the plurality of light modulation units 4R, 4G, and 4B to one another are provided. In this embodiment, the refrigerant holder 71B attached to the light modulation unit 4B and the refrigerant holder 71R attached to the light modulation unit 4R are connected to, via the connecting parts 73a and 73b, both sides of the refrigerant holder 71G attached to the light modulation unit 4G.

The connecting part 73a connects the refrigerant holder 71G attached to the light modulation unit 4G and the refrigerant holder 71B attached to the light modulation unit 4B. Consequently, the refrigerant holder 71B is coupled to the coupling part 54 of the refrigerant sender 50 via the refrigerant holder 71G. As shown in FIG. 6, a cover 74 that covers the connecting part 73a is provided in the connecting part 73a. The cover 74 is, for example, a film made of resin.

The connecting part 73b connects the refrigerant holder 71 attached to the light modulation unit 4G and the refrigerant holder 71 attached to the light modulation unit 4R. Consequently, the refrigerant holder 71R is coupled to the coupling part 54 of the refrigerant sender 50 via the refrigerant holder 71G. Although not shown in FIG. 6, the cover 74 is also provided in the connecting part 73b as in the connecting part 73a.

The refrigerant W generated by the refrigerant generator 20 is transferred to the refrigerant holder 71G by the coupling part 54 of the refrigerant sender 50. The refrigerant W transferred to the refrigerant holder 71G is transferred to the refrigerant holder 71B via the connecting part 73a and transferred to the refrigerant holder 71R via the connecting part 73b. In this way, the refrigerant W generated by the refrigerant generator 20 is transferred to three light modulation units 4R, 4G, and 4B. The refrigerant W transferred and held by the refrigerant holder 71 vaporizes, whereby the light modulation units 4R, 4G, and 4B, which are the cooling targets, are cooled. More specifically, the refrigerant W held by the refrigerant holder 71 vaporizes, whereby the holding frame 80, to which the refrigerant holder 71 is attached, is cooled. The holding frame 80 is cooled, whereby the light modulators 4RP, 4GP, and 4BP held by the holding frame 80 are cooled. Consequently, the light modulators 4RP, 4GP, and 4BP, which are the cooling targets, can be cooled by the cooler 10.

According to this embodiment, the cooler 10 can transfer the refrigerant W generated by the refrigerant generator 20 to the cooling targets with the refrigerant sender 50, take heat from the cooling targets by using the vaporization of the refrigerant W, which is endothermic reaction, and cool the cooling targets. The cooling by the vaporization of the refrigerant W can actively take heat from the cooling targets. Therefore, the cooling by the vaporization of the refrigerant W is excellent in cooling performance compared with when the cooling targets are simply cooled by heat transfer to a refrigerant as in air cooling and liquid cooling. Consequently, when the same cooling performance as the cooling performance of the air cooling and the liquid cooling is obtained, it is easy to reduce the entire cooler 10 in size compared with the air cooling and the liquid cooling.

In the case of the cooling by the vaporization of the refrigerant W, the cooling performance can be improved by increasing a surface area in which the vaporizing refrigerant W is in contact with the cooling targets. Therefore, noise can be suppressed from increasing even if the cooling performance by the cooler 10 is increased. Therefore, according to this embodiment, the projector 1 including the cooler 10 excellent in cooling performance, small in size, and excellent in silence is obtained.

According to this embodiment, since the refrigerant W can be generated in the refrigerant generator 20, a user does not have trouble in supplying the refrigerant W. Convenience for the user can be improved. It is possible to adjust, with the refrigerant generator 20, the refrigerant W to be generated as necessary when necessary. Therefore, the refrigerant W does not have to be stored in a storage tank or the like. The weight of the projector 1 can be reduced.

According to this embodiment, vapor contained in the air AR1 sent from the first blower 60 can be absorbed by the moisture absorbing and releasing member 40. Moisture absorbed by the moisture absorbing and releasing member 40 can be released into, as vapor, the air AR2 sent by the second blower 23. The moisture released to the air AR2 as the vapor can be condensed by the heat exchanger 30 to generate the refrigerant W. Consequently, according to this embodiment, the refrigerant W can be generated from atmosphere in the projector 1.

According to this embodiment, the cooling air AR3 for cooling the air AR2 in the internal space 35 via the channels 34 circulates on the insides of the plurality of channels 34 disposed in the internal space 35 of the housing 31. Therefore, in the internal space 35, the vapor contained in the air AR2 can be condensed to generate the refrigerant W. The air AR2 in the internal space 35 is cooled via surfaces exposed to the internal space 35 in the plurality of channels 34. Accordingly, for example, as the number of the channels 34 is increased, the surface areas of the channels 34 exposed to the internal space 35 can be increased and the air AR2 can be more easily cooled. Consequently, it is easy to condense the vapor contained in the air AR2 and generate the refrigerant W. Therefore, it is possible to improve refrigerant generation efficiency in the refrigerant generator 20.

As the outer diameter of the channels 34 is reduced, the number of the channels 34 that can be disposed in the internal space 35 increases. On the other hand, when the outer diameter of the channels 34 decreases, the surface area per one channel 34 decreases. However, since the number of the channels 34 that can be disposed in the internal space 35 can be increased, as a result, it is easy to increase a total of the surface areas of the plurality of channels 34. Consequently, it is possible to improve the refrigerant generation efficiency in the refrigerant generator 20.

Since the refrigerant generation efficiency in the refrigerant generator 20 can be improved, it is also possible to reduce the heat exchanger 30 in size while maintaining a generation amount of the refrigerant W in the heat exchanger 30. Consequently, it is possible to reduce the projector 1 in size.

As the number of the channels 34 is increased as explained above, a gap among the channels 34 decreases. In this case, it is conceivable that the flow of the air AR2 in the internal space 35 is hindered because, for example, a pressure loss that occurs in the air AR2 passing the internal space 35 increases or unevenness occurs in the flow of the air AR2. However, in the internal space 35, as a retention time of the air AR2 is longer, a time for condensing the vapor contained in the air AR2 can be increased. Accordingly, by increasing the number of the channels 34 and hindering the flow of the air AR2 in the internal space 35 to a certain degree, it is possible to generate more refrigerant W from the air AR2. Consequently, it is possible to further improve the refrigerant generation efficiency in the refrigerant generator 20.

For example, when the air from the second blower is fed into the plurality of channels and the refrigerant W is generated in the plurality of channels, the channels are likely to be clogged by the refrigerant W. In particular, when the temperature of an environment in which the projector 1 is set is relatively low, it is likely that the refrigerant W coagulates and the channels are clogged.

On the other hand, according to this embodiment, the refrigerant W is generated in the internal space 35 rather than in the channels 34. Therefore, the channels 34 are not clogged by the generated refrigerant W. It is easy to collect the refrigerant W in one place in the internal space 35 compared with when the refrigerant W is generated in the plurality of channels 34. Therefore, even when, for example, the posture of the projector 1 changes, it is easy to send the refrigerant W in the internal space 35 to the cooling targets with the refrigerant sender 50.

For example, when the air from the second blower is fed into the plurality of channels and the refrigerant W is generated in the plurality of channels, the air in the channels is cooled by feeding the air to the plurality of channels from the outside. In this case, fluctuation easily occurs in the sending of the air from the outside in each of the plurality of channels. Accordingly, a generation degree of the refrigerant W is likely to fluctuate in each of the channels.

On the other hand, according to this embodiment, the air AR2 in the internal space 35 is cooled by the cooling air AR3 flowing on the insides of the channels 34. Accordingly, it is easy to uniformly cool the entire air AR2 in the internal space 35 by uniformly disposing the channels 34 in the internal space 35. Consequently, the refrigerant W can be more easily generated in the internal space 35. It is possible to further improve the refrigerant generation efficiency of the refrigerant generator 20.

The air AR2 in the internal space 35 can be more easily cooled by the cooling air AR3 by setting a flow rate of the cooling air AR3 flowing in the channels 34 relatively large. On the other hand, when the flow rate of the cooling air AR3 is set relatively large, noise due to the flow of the cooling air AR3 tends to be large. However, in this embodiment, since the cooling air AR3 passes the inside of the channels 34 disposed in the internal space 35, the noise due to the flow of the cooling air AR3 less easily leaks to the outside of the housing 31. Therefore, it is possible to suppress the noise caused by the projector 1 from increasing while setting the flow rate of the cooling air AR3 relatively large and improving cooling efficiency of the air AR2 in the internal space 35.

A channel area in the channels 34 is smaller than a channel area of the internal space 35. Accordingly, the flow rate of the cooling air AR3 flowing in the channels 34 tends to be larger than a flow rate of the air AR2 flowing in the internal space 35. Consequently, it is easy to set the flow rate of the cooling air AR3 relatively large in the channels 34. Therefore, it is easy to suitably cool the air AR2 in the internal space 35 via the channels 34 with the cooling air AR3. Accordingly, it is possible to further improve the refrigerant generation efficiency of the refrigerant generator 20.

On the other hand, it is easy to set the flow rate of the air AR2 flowing in the internal space 35 relatively small. Accordingly, the retention time of the air AR2 in the internal space 35 can be extended. Consequently, the time for condensing the vapor of the air AR2 in the internal space 35 can be increased. It is easier to generate the refrigerant W from the air AR2. Therefore, it is possible to further improve the refrigerant generation efficiency of the refrigerant generator 20.

According to this embodiment, the refrigerant generator 20 includes the third blower 61 that sends the cooling air AR3 to the insides of the plurality of channels 34. Accordingly, it is easy to send the cooling air AR3 to the insides of the plurality of channels 34. It is easy to cool the air AR2 in the internal space 35 via the channels 34.

According to this embodiment, the third blower 61 sends the cooling air AR3 to the insides of the plurality of channels 34 from the inflow ports 34*a* via the inflow duct 32, on the inside of which the inflow ports 34*a* of the plurality of channels 34 are opened. Accordingly, the cooling air AR3 emitted from the third blower 61 can be guided into the insides of the channels 34 by the inflow duct 32. Therefore, it is easy to send the cooling air AR3 to the insides of the channels 34.

According to this embodiment, the end portion 54*a* of the coupling part 54 of the refrigerant sender 50 is exposed to the internal space 35. Accordingly, the end portion 54*a* of the coupling part 54 can be brought into contact with the refrigerant W generated in the internal space 35. The coupling part 54 is made of a porous member. Accordingly, it is possible to cause the coupling part 54 to absorb the refrigerant W via the end portion 54*a*. It is possible to transfer the refrigerant W to the cooling targets with the capillarity. Consequently, the refrigerant W generated in the internal space 35 by the refrigerant sender 50 can be easily transferred to the cooling targets. It is unnecessary to separately prepare power such as a pump in order to transfer the refrigerant W. Consequently, it is possible to suppress the number of components of the projector 1 from increasing. It is easier to reduce the projector 1 in size and weight.

For example, in the refrigerant generator 20, when the humidity of the air AR2 sent from the second blower 23 to the heat exchanger 30 is relatively low, even if the heat exchanger 30 is cooled, the refrigerant W is less easily generated. The humidity of the air AR2 sent to the heat exchanger 30 sometimes falls, for example, when air or the like outside the projector 1 is mixed in the air AR2.

On the other hand, according to this embodiment, the refrigerant generator 20 includes the circulation path 27 in which the air AR2 emitted from the second blower 23 circulates. Accordingly, the air outside the projector 1 can be suppressed from entering the circulation path 27 by substantially closing the circulation path 27. It is easy to maintain the humidity of the air AR2 sent to the heat exchanger 30 in a relatively high state. Therefore, it is possible to suitably generate the refrigerant W by cooling the internal space 35 via the plurality of channels 34.

According to this embodiment, the plurality of channels 34 extend in a direction (the extending direction DE) crossing a direction (the rotation axis direction DR) in which the air AR2 flows in the internal space 35. Accordingly, it is easy to bring the air AR2 into contact with the surfaces of the plurality of channels 34 in the internal space 35. It is easy to cool the air AR2. Consequently, it is possible to further improve the refrigerant generation efficiency of the refrigerant generator 20.

According to this embodiment, the plurality of channels 34 are the linearly extending conduits. Accordingly, it is easy to feed the cooling air AR3 to the insides of the channels 34. The channels 34 can be easily formed. Manufacturing cost for the refrigerant generator 20 can be reduced.

According to this embodiment, the plurality of channels 34 extend in the directions parallel to one another. Accordingly, it is easy to dispose the plurality of channels 34 with high space efficiency in the internal space 35. Consequently, it is easy to increase the number of the channels 34. Therefore, it is possible to further improve the refrigerant generation efficiency of the refrigerant generator 20.

According to this embodiment, the first blower 60 is a cooling air blower that sends the air AR1 to the light modulation units 4R, 4G, and 4B, which are the cooling targets. Accordingly, it is easy to vaporize the refrigerant W transferred to the light modulation units 4R, 4G, and 4B with the air AR1. The light modulation units 4R, 4G, and 4B can be further cooled. It is unnecessary to separately provide, other than the first blower 60, a cooling air blower that cools the cooling targets. Therefore, it is possible to suppress the number of components of the projector 1 from increasing and suppress noise from increasing.

As explained above, in this embodiment, vaporization of the refrigerant W sent to the cooling targets is facilitated using the first blower 60, which is an intake fan that takes outside air into the inside of the projector 1. Accordingly, even if an output of the first blower 60 is reduced, it is possible to obtain cooling performance equivalent to cooling performance obtained when the cooler 10 is not provided. Therefore, it is possible to reduce the output of the first blower 60, which is the intake fan, and reduce noise caused by the first blower 60. It is possible to further improve silence of the projector 1.

According to this embodiment, the heater 22 includes the heating main body 22a that heats air before passing the portion of the moisture absorbing and releasing member 40 located in the second region F2 and the second blower 23. Accordingly, it is possible to heat the portion of the moisture absorbing and releasing member 40 located in the second region F2 by sending the air AR2 to the moisture absorbing and releasing member 40 with the second blower 23. Consequently, even if the heating main body 22a is disposed in a position away from the moisture absorbing and releasing member 40, the moisture absorbing and releasing member 40 can be heated by the heater 22. Therefore, it is possible to improve flexibility of the configuration of the heater 22.

According to this embodiment, the refrigerant generator 20 includes the motor 24 that rotates the moisture absorbing and releasing member 40. Accordingly, the moisture absorbing and releasing member 40 can be stably rotated at constant speed. Consequently, it is possible to cause the portion of the moisture absorbing and releasing member 40 located in the first region F1 to suitably absorb vapor from the air AR1. It is possible to cause the portion of the moisture absorbing and releasing member 40 located in the second region F2 to suitably release moisture to the air AR2. Therefore, the refrigerant W can be efficiently generated.

According to this embodiment, the refrigerant holders 71 that are provided in the light modulation units 4R, 4G, and 4B, which are the cooling targets, and hold the refrigerant W are provided. Accordingly, the refrigerant W transferred to the light modulation units 4R, 4G, and 4B can be held in the light modulation units 4R, 4G, and 4B by the refrigerant holders 71 until the refrigerant W vaporizes. Consequently, it is easy to use the generated refrigerant W without waste. It is possible to further improve the cooling performance of the cooler 10.

According to this embodiment, the refrigerant holder 71 is attached to the surface of each of the light modulation units 4R, 4G, and 4B, which are the cooling targets, and made of the porous member. At least a portion of the refrigerant holder 71 is exposed when viewed from the refrigerant holder 71 side in the stacking direction. Accordingly, it is easy to vaporize the refrigerant W from the exposed portion of the refrigerant holder 71. It is possible to further improve the cooling performance of the cooler 10. Since the refrigerant holder 71 is made of the porous member, it is easy to uniformly spread the refrigerant W over the surface of the cooling target, in which the refrigerant holder 71 is provided, with the capillarity. It is easier to cool the cooling targets.

For example, when the refrigerant holder 71 is fixed to the holding frame 80 by an adhesive, in some case, the adhesive is absorbed by the refrigerant holder 71 and holes of the refrigerant holder 71 made of the porous member are closed. Accordingly, in some case, the refrigerant W is less easily absorbed by the refrigerant holder 71 and is less easily held by the refrigerant holder 71.

On the other hand, according to this embodiment, the fixing member 72 that holds and fixes the refrigerant holder 71 between the fixing member 72 and the holding frame 80 is provided. Accordingly, it is possible to fix the refrigerant holder 71 to the holding frame 80 without using the adhesive. Consequently, it is possible to suppress the refrigerant W from being less easily held by the refrigerant holder 71. In this embodiment, the fixing member 72 is made of metal. Accordingly, the fixing member 72 has relatively high thermal conductivity and is easily cooled. Therefore, the temperature of the fixing member 72 easily falls according to the vaporization of the air AR1 emitted from the first blower 60 and the refrigerant W. It is easier to cool the cooling target in contact with the fixing member 72.

According to this embodiment, the refrigerant holder 71 is provided on the surface on the light incident side of the light modulator 4GP in the holding frame 80. Accordingly, vapor of the refrigerant W vaporized from the refrigerant holder 71 can be suppressed from affecting light emitted from the light modulator 4GP to the light combination optical system 5. Consequently, it is possible to suppress noise from occurring in an image projected from the projector 1.

According to this embodiment, the refrigerant holder 71 is provided in each of the plurality of light modulation units 4R, 4G, and 4B. The connecting parts 73a and 73b that connect a plurality of refrigerant holders 71 to one another are provided. Accordingly, by coupling the refrigerant sender 50 to one refrigerant holder 71, it is possible to transfer the refrigerant W to the other refrigerant holders 71 as well. Consequently, it is possible to simplify routing of the refrigerant sender 50 on the inside of the projector 1.

According to this embodiment, the covers 74 that respectively cover the connecting parts 73a and 73b are provided in the connecting parts 73a and 73b. Accordingly, the refrigerant W moving along the connecting parts 73a and 73b can be suppressed from vaporizing in the connecting parts 73a and 73b. Consequently, the refrigerant W can be suppressed from vaporizing without contributing to cooling of the light modulation units 4R, 4G, and 4B, which are the cooling targets. The generated refrigerant W can be suppressed from being wasted.

In this embodiment, the coupling part 54 may be covered like the connecting parts 73a and 73b. With this configuration, the refrigerant W can be suppressed from vaporizing while being transferred to the cooling targets. Accordingly, the refrigerant W can be efficiently transferred to the cooling targets. The generated refrigerant W can be further suppressed from being wasted. The peripheries of the coupling part 54 and the connecting parts 73a and 73b may be covered by, for example, tubes. Coating for suppressing vaporization may be applied to the surfaces of the coupling part 54 and the connecting parts 73a and 73b.

Embodiments of the present disclosure are not limited to the embodiment explained above. Configurations explained below can also be adopted.

A method of feeding cooling air to the insides of the plurality of channels is not particularly limited. For example, in the embodiment explained above, the air AR1 emitted from the first blower 60 may be fed into the insides of the channels 34 as cooling air. With this configuration, it is unnecessary to separately provide the third blower 61. It is possible to suppress the number of components of the projector 1 from increasing. It is possible to suppress noise caused by the projector 1 from increasing compared with when the third blower 61 is separately provided. In this configuration, the inflow duct 32 may be extended to one side (the +DR side) in the rotation axis direction DR of the moisture absorbing and releasing member 40. The air AR1 that has passed the moisture absorbing and releasing member 40 may be fed into the inflow duct 32.

The configuration of the channels is not particularly limited if the channels are disposed in the internal space and the insides of the channels are separated from the internal space. The channels may extend in a curve shape. The channels may not be the conduits. For example, holes through which cooling air passes may be formed on the inside of a column section or the like disposed in the internal space. The plurality of channels may extend in directions different from one another. The number of channels is not particularly limited if the number is two or more.

The position of the inflow hole provided in the housing and the position of the outflow hole provided in the housing are not particularly limited. For example, in the embodiment explained above, the inflow hole 31a and the outflow hole 31b may be disposed in positions not overlapping each other when viewed along the rotation axis direction DR. The inflow hole 31a and the outflow hole 31b may be provided in the same sidewall in the housing 31. In this case, it is possible to cause the air AR2 to be easily retained in the internal space 35. It is easy to improve the refrigerant generation efficiency.

The refrigerant generator 20 may include an external blower that sends air to the housing from the outside of the housing. As the external blower, for example, a configuration like an external blower 160 indicated by an alternate long and two short dashes line in FIG. 5 can be adopted. The external blower 160 is located on the other side (a −DT side) in the thickness direction of the housing 31. The external blower 160 is, for example, an axial fan. The external blower 160 sends air AR4 from the outside of the housing 31 to the housing 31. More specifically, the external blower 160 sends the air AR4 from the other side (the −DT side) to one side (a +DT side) of the housing 31 in the thickness direction DT. It is possible to cool the air AR2 in the internal space 35 from the outside of the housing 31 by sending the air AR4 with the external blower 160. Consequently, it is possible to more easily condense vapor contained in the air AR2. It is possible to further improve the refrigerant generation efficiency. The external blower 160 may be a centrifugal fan.

A plurality of fins may be provided on the inner wall surface of the housing of the heat exchanger, that is, the inner side surface forming the internal space. In this case, it is possible to increase the area of the inner side surface of the internal space. It is possible to easily condense vapor contained in air on the inner side surface of the internal space. Accordingly, it is possible to improve the refrigerant generation efficiency. In particular, when the external blower is provided, the housing is cooled and the air in the internal space is cooled via the inner side surface of the internal space. Therefore, it is easier to condense the vapor on the inner side surface of the internal space.

A plurality of fins may be provided on the outer wall surface of the housing. With this configuration, it is easy to emit heat to the outside from the inside of the housing. Accordingly, it is easier to cool the air in the internal space. In particular, it is easier to cool the air in the internal space by sending the air to the plurality of fins provided on the outer wall surface of the housing with the external blower. Therefore, it is possible to further improve the refrigerant generation efficiency.

The refrigerant sender may include a capturing part made of a porous member disposed in the internal space. By connecting the capturing part to the coupling part, it is possible to absorb, with the capturing paer, the refrigerant generated in the internal space and transfer the refrigerant to the coupling part. Consequently, it is easy to send the generated refrigerant to the cooling targets without waste.

The heater is not limited to the embodiment explained above. The heater may come into contact with and heat the moisture absorbing and releasing member. In this case, the heater may not heat air before passing the moisture absorbing and releasing member.

In the embodiment explained above, the cooling air blower is the first blower 60 provided in the refrigerant generator 20. However, the cooling air blower is not limited to this. The cooling air blower may be separately provided other than the blower provided in the refrigerant generator 20.

In the embodiment explained above, the cooling targets are the light modulation units. However, the cooling targets are not limited to this. The cooling targets may include at least one of the light modulators, the light modulation units, the light source device, a wavelength conversion element that converts a wavelength of light emitted from the light source device, a diffusing element that diffuses the light emitted from the light source device, and a polarization conversion element that converts a polarization direction of the light emitted from the light source device. With this configuration, the sections of the projectors can be cooled in the same manner as explained above.

In this embodiment, the present disclosure is applied to a transmission-type projector. However, the present disclosure can also be applied to a reflection-type projector. The "transmission type" means that a light modulator including a liquid crystal panel is a type that transmits light. The "reflection type" means that the light modulator is a type that reflects light. The light modulator is not limited to the liquid crystal panel or the like and may be, for example, a light modulator including a micromirror.

In the embodiment, an example of the projector including the three light modulators is explained. However, the present disclosure can also be applied to a projector including only one light modulator and a projector including four or more light modulators.

The configurations explained in this specification can be combined as appropriate in a range in which the configurations are not contradictory to one another.

What is claimed is:

1. A projector including a cooling target, the projector comprising:
   a light source configured to emit light;
   a light modulator configured to modulate, according to an image signal, the light emitted from the light source;
   a projection optical device configured to project the light modulated by the light modulator; and
   a cooler configured to cool the cooling target based on transformation of a refrigerant into gas, wherein
   the cooler includes:
      a refrigerant generator configured to generate the refrigerant,
      a refrigerant sender configured to transfer the generated refrigerant toward the cooling target,
   the refrigerant generator includes:
      a rotating moisture absorbing and releasing member;
      a first blower configured to send air to a portion of the moisture absorbing and releasing member located in a first region;
      a heat exchanger connected to the refrigerant sender;
      a heater configured to heat a portion of the moisture absorbing and releasing member located in a second region different from the first region; and
      a second blower configured to send, to the heat exchanger, air around the portion heated by the heater in the moisture absorbing and releasing member,
   the heat exchanger includes:
      a housing including an internal space into which the air sent by the second blower flows; and
      a plurality of channels disposed in the internal space,
   insides of the plurality of channels are separated from the internal space, and
   cooling air for cooling the air in the internal space via the plurality of channels flow through the insides of the plurality of channels.

2. The projector according to claim 1, wherein the refrigerant generator includes a third blower configured to send the cooling air to the insides of the plurality of channels.

3. The projector according to claim 2, wherein
   the refrigerant generator includes an inflow duct coupled to the housing,
   inflow ports of the plurality of channels are opened on an inside of the inflow duct, and
   the third blower sends the air to the insides of the plurality of channels from the inflow ports via the inflow duct.

4. The projector according to claim 1, wherein
   the refrigerant sender includes a coupling part made of a porous member and configured to couple the housing and the cooling target, and
   an end portion coupled to the housing in the coupling part is exposed to the internal space.

5. The projector according to claim 1, wherein
   the refrigerant generator includes a circulation path in which the air emitted from the second blower circulates, and
   the circulation path passes the moisture absorbing and releasing member and the internal space.

6. The projector according to claim 5, wherein the plurality of channels extend in a direction crossing a direction in which the air flows in the internal space.

7. The projector according to claim 1, wherein the plurality of channels are linearly extending conduits.

8. The projector according to claim 1, wherein the plurality of channels extend in directions parallel to one another.

9. The projector according to claim 1, wherein the refrigerant generator includes an external blower configured to send the air to the housing from an outside of the housing.

10. The projector according to claim 1, wherein the cooling target is the light modulator.

* * * * *